Jan. 6, 1931.  J. F. MARTIN  1,788,062
IMPULSE COUPLING
Filed Dec. 17, 1929  2 Sheets-Sheet 1
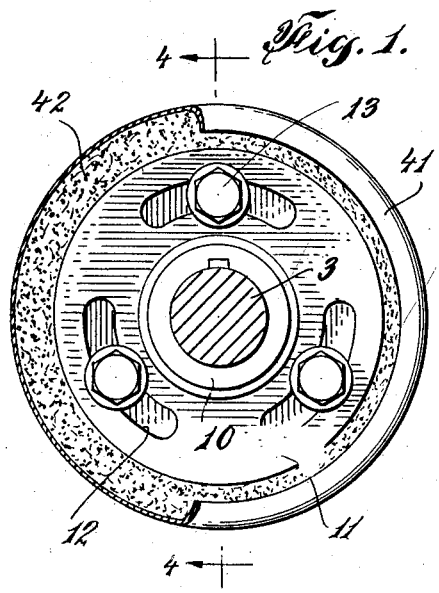
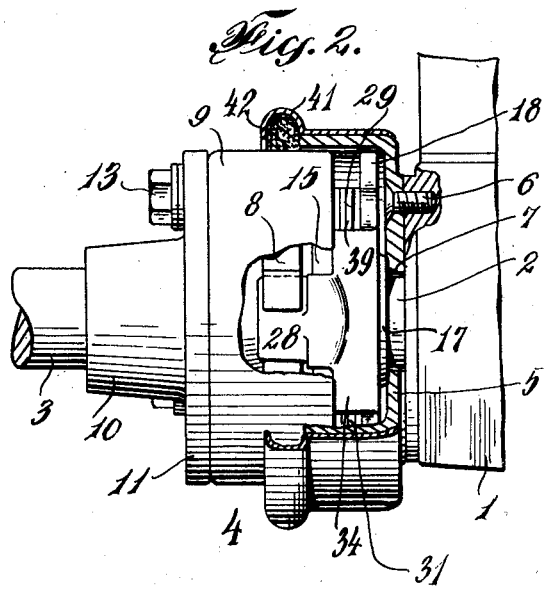
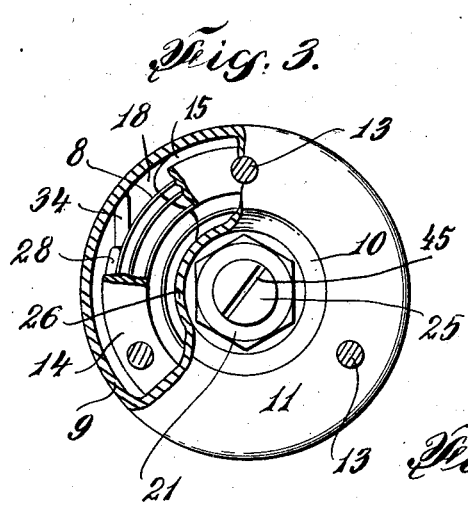
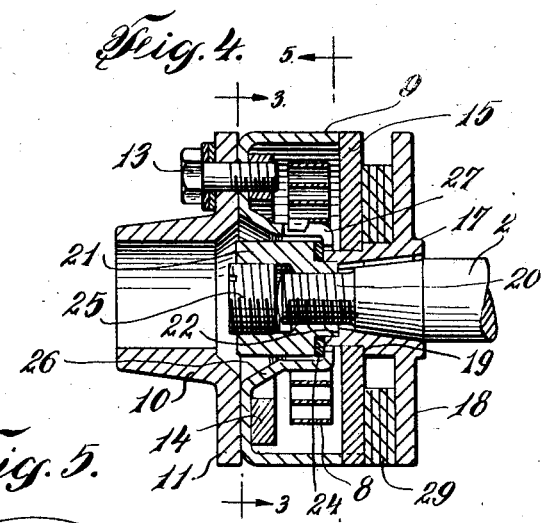
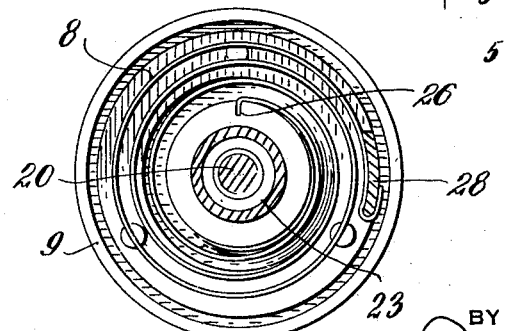
INVENTOR
J. F. Martin.
BY
ATTORNEY Jan. 6, 1931.  J. F. MARTIN  1,788,062
IMPULSE COUPLING
Filed Dec. 17, 1929  2 Sheets-Sheet 2
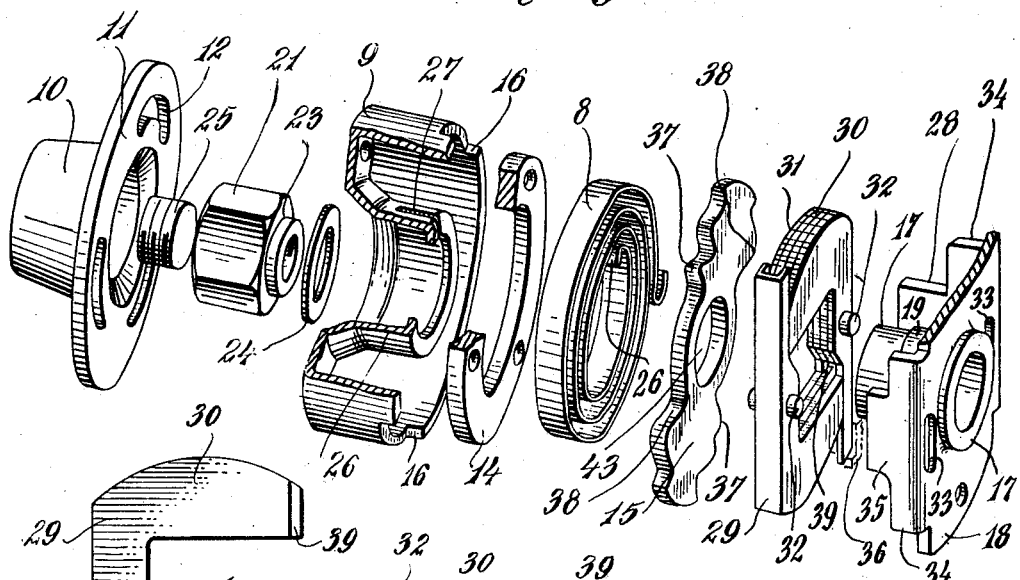
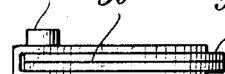
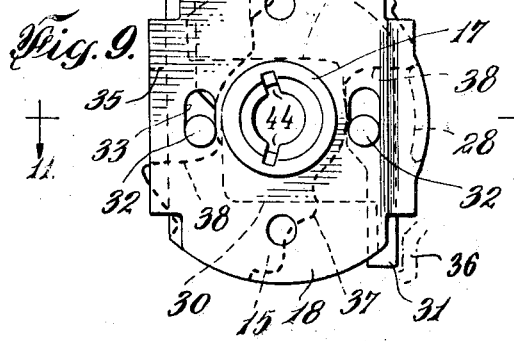
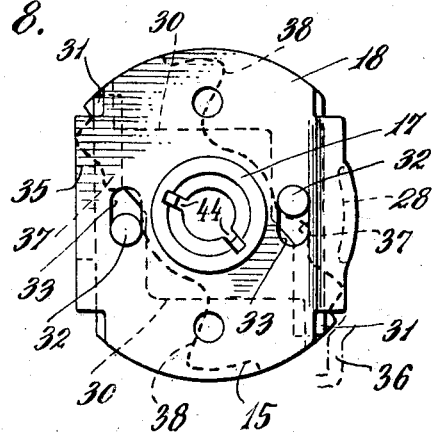
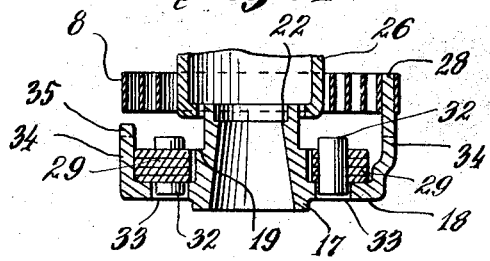
INVENTOR
J. F. Martin.
BY
ATTORNEY Patented Jan. 6, 1931

1,788,062

UNITED STATES PATENT OFFICE

JOHN F. MARTIN, OF SPRINGFIELD, MASSACHUSETTS, ASSIGNOR TO AMERICAN BOSCH MAGNETO CORPORATION, OF SPRINGFIELD, MASSACHUSETTS, A CORPORATION OF NEW YORK

IMPULSE COUPLING

Application filed December 17, 1929. Serial No. 414,664.

This invention relates to improvements in impulse couplings by which a driving member, under given conditions, can impart a momentarily accelerated movement to a driven member; and it especially pertains to impulse couplings for magnetos built to supply ignition current to internal combustion engines.

An object of the invention is to provide an efficient, durable, inexpensive and self-contained impulse coupling to connect such a magneto to a drive shaft of the engine and actuate the magneto at starting with sufficient quickness, through each instant of ignition, to produce a good sparking current.

A further object of the invention is to provide an impulse coupling which may consist entirely of metal parts adapted to allow for any slight misalignment of the driving and driven members; and which requires no interposed connecting element of fabric or the like that has previously been employed for this purpose. The absence of such a fabric connecting element simplifies the design and permits a material saving in manufacturing costs.

Another object is to provide an impulse coupling so constructed and assembled as to be entirely noiseless in operation.

An additional object herein is to provide an impulse coupling which can be easily attached and adjusted to unite a magneto with a drive shaft, and which will automatically cease to accelerate the magneto as soon as the engine attains a predetermined speed.

In its preferred form the coupling comprises a casing to be keyed on the drive shaft, and a cover affixed to the frame work of the magneto, which has an armature with a shaft projecting out through said cover, and joined to the drive shaft by a suitable spring in said casing. The cover has one or more stops inside and the coupling includes one or more releasable catches, rotatable with the armature shaft, to engage said stops and thus temporarily arrest the armature. The spring is thus tensioned, but the catches are then immediately liberated and the spring at once throws the armature forward with sufficient quickness to generate the relatively large amount of electrical energy required. This function is performed twice for each revolution of the armature, but ceases when the engine reaches the desired number of revolutions per minute, whereupon the magneto will be driven in the normal manner, and no more impulses will be given to it.

Yet a further object of the invention is to provide an impulse coupling of a small number of parts all of which are entirely enclosed and protected against the entrance of dirt and the possibility of breakage or damage.

The nature of the invention will appear from the following description, but of course changes may be made in various details, such as shape, size and arrangement of the parts, without going beyond the principle of the invention or exceeding its scope.

On the drawings:

Fig. 1 is a front view of the exterior of an impulse coupling according to this invention, partly broken away to show the packing for the cover; Fig. 2 is a side view partly in section; Fig. 3 is a front view partly in section on the line 3—3 of Fig. 4 to show some of the enclosed parts; Fig. 4 is a full longitudinal section with the cover omitted; Fig. 5 is a cross section on the line 5—5 of Fig. 4; Fig. 6 is a perspective view of all the parts except the cover of the coupling, in the relative positions they assume when assembled; Fig. 7 is a side view and Fig. 8 a top view of one of the releasable catches; Figs. 9 and 10 are diagrammatic views to show how the catches are controlled; Fig. 11 is a horizontal, longitudinal section of a detail illustrating the mode of connecting the magneto and the drive shaft through the spring; and Fig. 12 is a detail of a part of the cover with the stop temporarily holding one of the catches to arrest the armature of the magneto and tension the spring.

The same numerals identify the same parts throughout.

The numeral 1 on Fig. 2 indicates the end of the housing of a magneto having an armature with a shaft 2. The drive shaft is shown at 3 and the impulse coupling 4 connects these two members. This coupling has a rimmed cover 5, secured by fastening devices such as screws 6 to the end of the magneto and at the center is an opening 7 for the driven member 2. A spring 8 in a casing 9, rigid with the drive shaft 3, is made fast to the casing at one extremity and is rigid with the shaft 2 at the other, and constitutes yielding means uniting the two shafts; and when the armature shaft 2 is temporarily arrested and then released, the spring is first tensioned and then acts to give the armtaure driven member a brisk throw forward until it catches up again with the shaft 3. When it receives such an impulse as the engine starts, the magneto can generate enough electrical energy to deliver an effective sparking current.

At 10 is a hub keyed to the shaft 3, and this hub has a rim or flange 11 with slots 12, through which are passed bolts 13. These bolts adjustably secure the hub 10 to the casing 9, and in the latter may be placed a strengthening ring 14 against the bottom to afford a good anchorage for the screws 13. This ring may, if desired, be affixed to the bottom of the casing 9 independent of the screws 13, in any suitable manner, so that it will be rigidly secured to the casing even when the hub 9 is not attached. The end of the casing 9 remote from the bottom is open, but is there spanned by an element 15, the ends of which fit into recesses 16 in the rim of the casing 9 and are held fast therein. This bridging element has a central opening for the hub 17 of a plate 18, this hub being keyed on the end of the shaft 2. The hub has an external shoulder 19 that abuts the member 15; and on the threaded extremity 20 of the shaft 2 inside the casing 9 is a holding nut 21. The hub 17 also has an inside shoulder 22 against which the reduced end of the nut engages; and between this shoulder and the shoulder 23 on the nut is a washer 24. The nut is also enlarged and threaded inside for a lock nut 25 which binds against the extremity of the shaft 2.

The casing 9 has an internal hub 26 with a slot 27 in which one end of the spring 8 is anchored. The other end of the spring has its end attached to a projection 28 at one side of the plate 18. Thus the shafts 3 and 2 are yieldably connected together. This projection 28 extends into the casing adjacent to the side thereof, past the element 15, to be in the plane of the spring 8. Between plate 18 and the casing 9 are two radially movable catch members 29; which are L-shaped, having transverse weighted arms 30 and channelled shanks 31. Through each catch near the mid-point is driven a stud 32, projecting from both sides; and at one end these studs enter slots 33 in the plate 18. This plate has flanges or ribs 34 at its opposite sides, and the projection 28 is integral with one of these ribs. See Fig. 6, wherein the top of the plate 18 is broken away to show the rib with the projection 34. From the other at the mid-point extends a similar but shorter projection 35. When the coupling is assembled both projections 28 and 35 enter the casing 9, the latter ending short of the spring 8; (see Fig. 11) and the shoulders on the flanges 34 at each side of these projections abut the rim of the casing; keeping the plate spaced from the casing and making room for the catches 29. A stop 36 on the inside of the rim of the closure 5 lies in position to be engaged by the end of the shank 31 of each catch 29, except when the weighted part 30 is as far away from the axis of rotation of the coupling as the closure 5 and the slots 33 will permit.

The stop 36 may be a recess in the casing 5 to present a shoulder to the catches, as shown in Fig. 12; or anything else that will form an obstruction to the catches 29; such as a stud or screw projecting from the inside of the rim of the casing in the right location.

On the sides of the bridging element at diametrically opposite points are two cam projections 37 and adjacent each cam 37 but on the opposite side is a stopping projection or edge 38. Normally the spring 8 acts to hold the plate 18 in such position that the projections 28 and 35 will abut the edges 38, but the diagonal edges 38 will move away from the projections 28 and 35 whenever the armature is retarded. The channelled parts 31 of the catches 29 act as guides and each receives a tongue 39 on the weighted part of the other. The rim of the closure 5 is shown with a hollow bead at 41 and within this bead is packing 42. The opening for the hub 17 of the plate 18 in the element 15 is shown at 43. The hub 17 may have two keyways 44 for right or left drive, and a kerf 45 in the nut 25 enables this nut to be easily turned in or removed.

The catches 29 occupy the relative positions illustrated in Fig. 6. The shanks lie between the hub 17 and the flanges 34, which engage the edges of the shanks, so that the catches rotate with the plate 18 but are free to move radially as far as the slots 33 allow.

I prefer to make the bead 41 as part of a ring 46, separate from the cover 5, and mounted thereon, as presented in Fig. 2. But the bead might of course be integral with the cover 5. In either case the cover and beaded ring together constitute a complete rimmed closure for the casing 9.

In operation, when the shaft 3 revolves the spring 8, it holds the plate 18 in such position that the projections 28 and 35 abut the edges 38 of the bridging or cam-bearing element 15; and casing 9 thus forces the plate 18 and armature to turn with it. When the engine is started the speed is of course low. As the catches 29 revolve and the shanks 31 come into vertical position, they of course drop of their own weight till their studs 32 come to rest in the lower ends of the slots 33 in the plate 18. In Fig. 9, the one catch is shown with its weighted cross arm 30 below the upper edge of the plate 18; and the other has its weighted cross arm in lowermost position with its curved edge flush with the lower edge of the plate 18; the first mentioned catch having the lower end of its shank projecting beyond the lower edge of the plate in position to strike against the stop 36 on the inside of the rim of the closure 5. In Figs 9 and 10 the parts are shown to illustrate different operative positions, and appear as when viewed from the right of Fig. 6. The stop 36 is on the side of the closure remote from the observer in Fig. 2. As rotation continues the stop 36 retards the plate 18 and shaft 2, while the shaft 3 puts the spring 8 under tension and casing 9 carries the cam-bearing element 15 on so that its edges 38 move away from the projections 28 and 35. Next the adjacent cam point 37 of the element 15, which is flat or plane engages the stud 32 on the arrested catch and moves this catch upward as shown in Fig. 10. As soon as the shank 31 is clear of the stop or shoulder 36, the spring 8, now under tension, throws the plate 18 and the armature forward with the accelerated speed necessary to produce the spark. The same operation is repeated with the catch at the left of Figs. 9 and 10 one-half of a revolution later, and continues till the engine speed increases and centrifugal force, acting on the heavy arms 30, retains these arms in their outermost radial positions, so that the ends of the shanks 31 no longer come within range of the stop 36. But until this condition arrives, the armature of the magneto is arrested twice in each revolution, and then thrown forward briskly enough to generate a strong sparking current; when if it rotated at no more than engine speed the electrical energy generated would not be enough.

In Fig. 2 the parts are shown as if rotated 180 degrees from the positions shown in Fig. 6, to bring the projection 28 over to the side nearest the observer.

This coupling therefore insures starting the engine. It is easy to put on and take off, and requires virtually no attention when in use. The cost of production is low, the number of parts of the device is small and its operation is always certain. With everything enclosed, there is no possibility of the coupling getting out of order.

The driving power of the shaft 2 is transmitted through the spring 8 and the resiliency of the spring allows for any slight misalignment of the shafts 8 and 12. Hence no other intermediate connecting parts of fabric or rubber composition are needed. Thus the coupling is simplified, expense is reduced and space is saved in the casing 9, so that the cam element 15 with its wide ends can be given large bearing surfaces where it engages the recesses 16 in the rim of this casing. The life of the coupling is therefore increased. The coupling makes no noise at all but runs quite silently when the functions above described are performed; for the striking together of the projections 28 and 35 against the edges 38 is not loud enough to be heard.

The catches 29 can be made in one piece stamped and doubled to give the form presented herein. (See Fig. 8). The ends 30 may have laminations between the doubled portions to make the weight larger. Any other convenient way of producing the catches can be adopted.

In Figs. 6, 9 and 10, the stop 36 is indicated only to show its position. When this stop has the form of a recess with a shoulder, as shown in Fig. 12, the bottom of the recess should preferably slant a little from the vertical shoulder towards the shank 31 of the oncoming catch, so as to ensure the engagement of the catch therewith.

Having described my invention, what I claim is:

1. An impulse coupling comprising a rotatable driven member, a casing, a fixed cover for said casing, and parts enclosed by the casing and cover and including a reciprocable catch, mounted eccentric to the axis of said member for arresting the driven member and releasing it, and imparting a temporarily accelerated motion to same.

2. A coupling comprising a casing, a fixed cover therefor, a driven shaft, a spring attached to the casing to transmit motion to the shaft, a stop in the cover, a reciprocable catch eccentrically carried by the shaft to strike the stop and cause the shaft to be arrested, and a member in the casing to liberate the catch to enable the spring to give an impulse to said shaft.

3. A coupling comprising a rotary driving member, a rotary driven member, yielding means connecting same, means for arresting said driven member, and one or more parts carried by the driven member eccentric to its axis and reciprocable transversely thereof to engage said means, and be released therefrom to arrest the driven member and enable an impulse to be imparted thereto.

4. A coupling comprising a rotary driving member, a rotary driven member, yielding means connecting same, one or more parts carried by the driven member eccentric to its axis and reciprocable transversely thereof, means for arresting said driven member by engaging said part or parts, and an element actuated by the driving member to release the driven member and enable it to receive an impulse to accelerate its motion.

5. A coupling comprising a rotary driven member, a plate mounted thereon, one or more catches having reciprocable connection with the plate mounted eccentric to the axis of rotation of the driven member, a stop to abut each catch and retard said member, a driving member, a yielding connection between said members, and an element bearing cam projections actuated by the driving member to free said catches from said stop.

6. An impulse coupling comprising a casing, a fixed closure for the casing, a driven member, parts in the cover and casing for arresting and accelerating said member, a hub having a rim with slots therein, and fastening devices passing through the slots for adjustably securing the rim to the casing.

7. In an impulse coupling, an article of manufacture comprising a slotted plate having a hub at its center and parallel flanges with projections at its opposite sides.

8. In an impulse coupling, an article of manufacture comprising a slotted plate having a hub, side flanges, and projections, one longer than the other, extending from the middle of said flanges.

9. In an impulse coupling, an article of manufacture comprising an L-shaped reciprocable catch, one arm of which is weighted.

10. In a coupling, a casing, a driven plate, a spring attached at one end to the casing, a projection on the plate extending into the casing and engaged by the other end of the spring, a bridging element on the casing engaged by said projection, a stop to retard said plate, a catch carried by said plate to engage the stop, and a cam on said element to release the catch.

11. A coupling comprising a casing, a rimmed closure enveloping the casing, a driven shaft entering the casing through the closure, a slotted plate on the shaft in the closure, said plate having flanges with projections entering the casing, an element spanning the end of the casing, the projections on the plate being at each side of said element, a spring in the casing and affixed thereto at one end and to one of the projections at the other, L-shaped catches with weighted arms having movable connection with the plate, a stop in the closure to engage the catches in turn and arrest said plate, and cams on the element to release said catches.

12. In an impulse coupling, an article of manufacture comprising an L-shaped catch with one arm weighted, and a stud projecting from both faces of said catch.

13. An impulse coupling comprising a casing, a driven member, reciprocable catches carried by said member, a spring connecting said casing and said member, a stop to engage each of said catches, and a cam-bearing element to release said catches as they engage said stop, said element bridging the casing and having relatively wide ends set into the rim of the casing.

14. A coupling comprising a rotary driven member, a plate mounted in transverse position on said member, said plate having a straight flange along one side and a catch reciprocably mounted on the face of said plate and having a portion between said flange and the axis of rotation of said member.

15. An impulse coupling comprising a driven member, a plate mounted thereon in transverse position, said plate having parallel flanges at its opposite sides and catches reciprocably mounted upon the face of said plate; said catches each having a portion between the axis of rotation of said member and the adjacent flange and being shaped for slidably engaging each other at their opposite ends.

16. In an impulse coupling a slotted plate having a hub, a side flange and a projection, and an impulse spring to engage the projection.

17. In an impulse coupling an article of manufacture comprising an L-shaped catch with a weighted arm, said catch having a projection at one end and being channeled at the other.

18. A coupling comprising a rotary driven member, a plate mounted in transverse position on said shaft and provided with a pair of flanges at its opposite sides, L-shaped catches adjacent the face of the plate and having portions between said flanges and the axis of rotation of said member, a casing, a spring connecting the casing to the plate and a transverse bridging element secured to the casing, said catches and said element having projections to enable the element to actuate said catches.

19. An impulse coupling comprising a driven member, a plate having a hub on the driven member, one or more catches adjacent to the face of the plate, a casing having an inside hub opening at one end through the bottom thereof, the other end of said hub receiving the end of the hub of the plate, a spring connecting the plate and casing, a bridging element on the casing having cams to actuate the catches, a driving hub having a flanged rim to secure it to the bottom of the casing in line with the hubs of the plate and casing, and fastening means within the hub of the casing to secure the plate upon the driven member.

In testimony whereof I affix my signature.

JOHN F. MARTIN.